United States Patent Office 2,918,386
Patented Dec. 22, 1959

2,918,386

NON-FIBROUS REGENERATED CELLULOSE FILM CONTAINING CO-RESIN AS ANCHOR AGENT

William M. Wooding, Old Greenwich, Conn., assignor to American Cyanamid Company, New York, N.Y., a corporation of Maine No Drawing. Application June 5, 1958
Serial No. 739,972

15 Claims. (Cl. 117—38)

The present invention relates to non-fibrous regenerated cellulose film uniformly impregnated with a small but effective amount of a normally water-soluble, substantially non-ionic, thermosetting, resinous co-resin as anchor agent and to the impregnated film carrying a subsequently-applied topcoat material. The invention includes the methods involved in applying the co-resin to the film and in applying topcoat material thereover.

Non-fibrous regenerated cellulose film is commercially manufactured by extrusion of viscose solution into an aqueous coagulating bath to form a film, clearing and washing the film, impregnating the film with a plasticizing or softening agent, and drying the plasticized film. Such film is both water-permeable and water-sensitive and cannot be used as wrapping material where moisture resistance is required. Such film, therefore, is customarily provided with an organic moisture proofing topcoat so as to permit the film to be used in contact with moisture as in the packaging of moist substances. In other instances the topcoat is applied for decorative purposes.

Organic water-proofing topcoat material, when applied directly to untreated regenerated cellulose film usually tends to slough off after prolonged contact with moisture. It has long been known that this sloughing off can be retarded by first applying a suitable anchoring resin to the regenerated cellulose film and then applying the topcoat. Such materials are generally lower catonic amino-formaldehyde condensation products which are converted to high molecular weight resins on the film by thermocurring before, during or after application of the topcoat. Up to the present, however, water-soluble non-ionic linear carbon chain polymers (e.g., polyacrylamide, and copolymers formed by reacting a major amount of a water-soluble $\alpha,\beta$-vinyl amide with a minor amount of styrene, vinyl acetate, ethyl acrylate) have found very little if any use as anchor agents and are practically valueless for the purpose.

The present invention principally rests upon the discovery that certain water-soluble cationic thermosetting co-resins are effective as anchor agents in non-fibrous regenerated cellulose film for subsequently applied topcoat material. The co-resins have not been defined in terms of structure but may be described in terms of their preparation. They are prepared by subjecting two pre-formed polymers to condensation. The first is a substantially non-ionic water-soluble linear carbon chain polymer at least 5% of the linear atoms of which carry a formaldehyde-reactive carboxamide substituent. The second is a water-soluble cationic thermosetting amino-formaldehyde resin.

The invention accordingly resides in cellulose film containing a small but effective amount of the above-described co-resin in hydrophobic form as anchor agent and in such film carrying hydrophobic organic topcoat material thereover.

The invention further resides in the process involved, i.e., in the steps of treating cellulose film to improve its anchoring capacity which comprises impregnating the film with an aqueous solution containing a small but effective amount of the co-resin for the purpose, drying the film, and thermocurring the co-resin with, if desired, subsequent application of topcoat material.

The present invention in preferred embodiments has a number of advantages. First, it opens a new field of usefulness for non-ionic linear carbon chain carboxamide polymers. As a result of the present invention, well anchored regenerated cellulose film may be prepared wherein the anchoring agent is composed of a major amount of the non-ionic polymer.

Then, it simplifies the manufacturing process. Anchoring baths containing the above-described co-resin are generally less sensitive to dissolved polyvalent anions, particularly sulfate ions, and operate over a broader pH range than baths prepared from the parent cationic amino-formaldehyde polymer.

Thirdly, the film produced is neutral or alkaline, and contains a decreased amount of formaldehyde. It thus is less apt to tender on aging and to develop an odor of formaldehyde when used as a wrap.

According to a preferred embodiment suitable for commercial practice, film of the present invention is prepared as follows.

A plasticizing-anchoring bath is formed by dissolving a suitable plasticizer such as glycerol or other polyhydric alcohol in water. Ordinarily such a solution contains about 5% to 15%–20% by weight of the plasticizer. There is then added sufficient of an aqueous solution of a co-resin of the present invention to provide an effective amount, between about 0.01% and 3%, based on the weight of the solution. The co-resins vary in effectiveness (depending chiefly on the identity of polymeric materials from which prepared, and the proportions in which the polymeric materials are reacted), and the optimum amount in any one instance, together with the optimum bath pH, can be easily determined by laboratory trial.

Regenerated cellulosic film (preferably but not necessarily in wet swollen condition) is then passed through the bath. The film may be air dried at room temperature and this is sufficient to cure the resin to an initial hydrophobic (i.e., water-insoluble) gel form. However, the film is more advantageously dried over steam-heated rolls and the temperature of the film during drying may be carried as high as 250° F. or higher so as to thermocure the resin substantially completely. Within the normal temperature range of 170° to 230° F. the co-resin is sufficiently cured as soon as the film becomes apparently dry to permit the film to be topcoated at once with good results. The use of higher temperatures generally results in a film having better anchoring capacity.

An organic moisture-proofing topcoat is then applied, and the film heated to dry the topcoat. The final film thus consists of the foregoing resin-impregnated film bearing topcoat material on either or both sides. The invention does not depend on the particular topcoat employed.

Amongst the topcoat materials which may be applied are those coating compositions containing as the film-forming constituent compounds such as nitrocellulose, cellulose acetate, methyl cellulose, polyethylene, deactylated chitin, rubber, chlorinated rubber, rubber hydrochloride, ethyl cellulose, butyl methacrylate, moisture-resistant lacquers, waxes such as montan wax, beeswax, carnauba wax, printer's ink, and in general conventional film-forming water-proofing materials. The topcoat is not necessarily a continuous film, and may and often does consist of printed legends, revenue stamps, or decorative matter. The topcoat material may be applied by roller-coating, spraying, impregnation, etc., and may be applied in hot melt, organic solution or aqueous latex form.

Alternatively, the anchoring resin may be applied by other convenient means including spray or roller coater, The co-resins employed in the present invention may be prepared by condensing a substantially non-ionic water-soluble linear carbon chain carboxamide polymer with a cationic thermosetting amino-aldehyde resin in water-soluble (hydrophilic) form, or by any equivalent process. Thus, as illustrations of one such equivalent process, the linear chain carboxamide may be prereacted with formaldehyde or may be formed from polymerizable N-methylol monomer such as N-methylol acrylamide, and then reacted with a cationic polymer containing no aldehyde. Suitable aldehyde-free cationic polymers are the ammonia-epichlorohydrin and polyalkylenepolyamine-epichlorohydrin high molecular weight adducts. Another such process is based on simultaneous formation of the cationic resin and condensation thereof with the linear carbon chain polymer, as when aqueous polyacrylamide is reacted with dimethylolurea in the presence of sufficient of a water-soluble polyalkylenepolyamine such as triethylenetetramine to ensure formation of a cationic molecule. Each of the processes described is a substantial equivalent, and no doubt still other processes can be devised by those skilled in the art.

The linear carboxamide polymer is condensed in suitable proportion with the cationic thermosetting amine-aldehyde resin to result in development of a unitary hydrophilic cationic resinous condensate which is water-soluble and distinctly cationic. In general, this requires at least 1 part of the latter per 10 parts of the former. On the other hand, the benefits of the present invention largely disappear when the amount of linear carboxamide polymer is less than 1/10 the weight of the cationic component. Accordingly it is preferred to react the two in weight ratio between 1:10 and 10:1.

The co-resins, even as produced in their normal hydrophilic form, are cross-linked to a significant extent and their structure is complex. For this reason and because they may be prepared by a variety of different processes the resins are most conveniently indentified and defined in terms of one typical process for their manufacture.

The carboxamide polymers employed for condensation with the cationic amino-aldehyde polymers are substantially non-ionic water-soluble linear carbon chain polymers (i.e., polyalkanes) at least 5% of the chain carbon atoms of which carry a formaldehyde-reactive carboxamide substituent either directly attached to the chain or indirectly as through an aryl, aliphatic or other non-ionic linkage. Suitable polymers may be formed by homopolymerization of water-soluble monomers, for example, acrylamide, methacrylamide, and crotonamide; and N-substituted water-soluble neutral acrylamides, for example, N-methyl acrylamide and N-2-hydroxyethyl methacrylamide. Such polymers are water-soluble and 50% of their linear carbon atoms carry one formaldehyde-reactive carboxamide substituent each. Water-soluble linear carbon chain polymers may be employed wherein the chain atoms may be made to carry a variety of substituent, the polymers for example corresponding to those formed by copolymerizing acrylamide or N-methylol acrylamide monomers with an $\alpha,\beta$-unsaturated non-ionic material copolymerizable therewith such as vinyl chloride, vinyl acetate, methyl acrylate, methyl vinyl ketone, methyl isopropenyl ketone, p-vinylbenzamide, acrylonitrile, p-methoxystyrene, p-chloromethylstyrene, and crotonaldehyde or mixtures thereof, whereby a linear carbon chain is formed carrying such essentially non-ionic substituents as nitrile, halogen, ester, ketone, and aldehyde groups. By hydrolysis some or all of the ester groups introduced by compounds such as vinyl acetate can be converted to hydroxy groups which also are non-ionic.

In the aforementioned polymers, at least about one linear carbon atom out of every 20 (that is about 5% of the polyalkane linear carbon chain atoms) carries an aldehyde-reactive carboxamide group as otherwise the polymer cannot be converted to adequately cationic form. A considerably higher frequency is preferred and in practice at least 25% of the chain carbon atoms are so substituted. A higher degree of substitution, up to about 75%, occurs in polymers prepared from polycarboxamide vinyl monomers represented by maleamide or fumaramide and thus the copolymerization of one mol of methacrylamide with one mol of fumaramide results in formation of a polymer 75% of the carbon atoms of which carry one carboxamide group each. The corresponding linear carbon chain sulfonamides are equivalents for the corresponding carboxamides.

The carboxamide polymers may be synthesized in any desired manner using an organic or aqueous medium as may be preferred. We have obtained good results by performing the polymerization according to a continuous aqueous method in the presence of a persulfate catalyst. The products obtained from aqueous polymerization may contain a small proportion of carboxyl groups resulting from hydrolysis of amide groups. Carboxamide polymers suitable for use in the present invention carry at most a negligible anionic charge, i.e., a charge which is wholly overcome by the subsequently added cationic material.

The polymerization is conducted to result in a polymer having a molecular weight of at least 10,000, a lower molecular weight being ineffective to impart satisfactory anchoring. The anchoring imparted increases with the length of the chain, and our evidence so far indicates a molecular weight of at least 100,000 to be a practical necessity. The maximum useful molecular weight is somewhat below the molecular size at which the material starts to gel. The viscosity of such material, however, is inconveniently high and in practice therefore we prefer the molecular weight to be between about 100,000 and 1,000,000.

The second principal material employed for preparation of the resins of the present invention are the normally water-dispersible cationic thermosetting amino-aldehyde resins, i.e., amino-aldehyde condensates aqueous solutions of which have a higher viscosity than the reagents in simplest condensed form. The resin may be in colloidal state of polymerization before condensation with the linear carbon chain carboxamide, or may be reacted with the carboxamide in a low resinous stage and subjected to further polymerization before addition to the film. There may be employed melamine-formaldehyde resins and melamine-urea-formaldehyde resins preferably in the advanced or acid colloid forms disclosed in U.S. Patents Nos. 2,345,543, 2,485,079 and 2,485,080, the amino alkyl urea resins of U.S. Patent No. 2,698,787; the colloidal ammeline formaldehyde resins of U.S. Patent No. 2,356,719, the dicyandiamide-formaldehyde and biguanide-formaldehyde resins of U.S. Patent No. 2,497,074, the urea-formaldehyde-polyalkylenepolyamine, guandine guanylurea resins of U.S. Patent No. 2,545,575, and the linear carbon chain poly-ureido resins of U.S. Patent No. 2,616,874. The foregoing resins all contain a large amount of combined formaldehyde and thus are suitable for direct condensation with the carboxamide linear polymers described above.

Alternatively, there may be employed the aliphatic polyamine-halohydrin resins of U.S. Patent No. 2,573,956; the ammonia-epichlorohydrin resin of U.S. Patent No. 2,573,957, and polyazaalkane resins such as polyethylenimine. Resins of this type may first be condensed with formaldehyde and then reacted with the linear chain carboxamide, or with a mixture of formaldehyde and the linear chain carboxamide. It appears immaterial whether the formaldehyde first reacts with the carboxamide or with the amino resin.

The linear carbon chain carboxamide and cationic aminoaldehyde resin are most easily condensed by mixing aqueous solutions or dispersions of the two to form a reaction mixture containing 10%–25% by weight of resin solids, any unreacted formaldehyde present being calculated as a resin solid. The condensation reaction usually takes place at room temperature as is evidenced by development of a very substantial increase in the viscosity of the liquid and is accelerated by heat. The condensation is preferably terminated when it is just short of the gel stage as may be determined by laboratory trial, the reaction speed varying considerably depending on the particular reagents employed, their concentration, and the pH and temperature. The reaction can be terminated by either diluting the solution with water to less than 5% solids content or cooling the solution to substantially below room temperature.

Cationic amino resins containing no combined formaldehyde are most conveniently condensed by first reacting the cationic resin with formaldehyde (preferably in slight excess) to introduce methylol groups therein, after which the carboxamide polymer is added and allowed to react as described. Alternatively, the formaldehyde may be reacted with the carboxamide polymer instead of the amino-aldehyde resin, and alternatively still a part of the formaldehyde may be reacted with the carboxamide polymer and the remainder with the cationic resin before the two are mixed.

According to a somewhat different method the carboxamide polymer is mixed with the components of the cationic resin, so that formation of the resin and condensation of the resin with the carboxamide polymer take place in one step. Thus the carboxamide polymer may be mixed with an equal weight of such materials as trimethylolmelamine, dimethylolurea, dimethylol guanidine, dimethylol thiourea and mixtures thereof, and about 10% of a polyalkylenepolyamine based on the weight of the foregoing, and the mixture reacted with a slight excess of formaldehyde over that stoichiometrically necessary to introduce one methylol group into each formaldehyde-reactive nitrogen atom present. In the case of melamine resins best results are usually obtained when the resins are first converted to colloid form.

From the foregoing it is evident that the invention does not primarily depend on the particular carboxamide polymer or cationic resin selected, or the matter in which the polymer and resin are condensed.

The invention will be more particularly illustrated by the examples which follow. These examples represent embodiments of the invention and are not to be construed in limitation thereof.

RESIN A

The following illustrates the preparation of a co-resin from polyacrylamide and a cationic melamine-formaldehyde acid colloid in 1:1 weight ratio.

To 10 ml. of a 12% aqueous hydrochloric acid melamine-formaldehyde colloid dispersion prepared according to U. S. Patent No. 2,345,543 (by mixing 100 gm. of trimethylol melamine with 770 cc. of 0.44 N hydrochloric acid and aging 3 hours) was added 10 ml. of a 12% aqueous solution of polyacrylamide of molecular weight of approximately 250,000.

The mixture was allowed to react by standing at room temperature for 30 minutes, during which a pronounced viscosity increase occurred.

The reaction was stopped by diluting the mixture to 1% solids with water. The product displayed a bluish colloidal haze and was strongly cationic.

RESIN B

The following illustrates the preparation of a co-resin from polyacrylamide with a urea-formaldehyde-polyalkylenepolyamine resin in 1:1 weight ratio.

To 8.9 g. of a 37.5% aqueous urea-formaldehyde-triethylenetetramine resin prepared according to Example 1 of U.S. Patent No. 2,554,475 (3.3 g. resin solids) was added 14.2 g. of a 17.4% aqueous solution of polyacrylamide (3.3 g. polyacrylamide). The molecular weight of the polyacrylamide was about 250,000. The mixture was diluted to 6.9% solids with water, adjusted to pH 1.8 with concentrated hydrochloric acid, and allowed to react for 18 hours at room temperature, 6 hours at 40° C. and 18 hours at 22° C., at which time from previous experience it was known that the mixture was close to the gel point. The reaction was stopped by diluting the mixture to 1% solids with water.

RESIN C

The following illustrates the preparation of the condensation product of polyacrylamide with a cationic urea-formaldehyde polyalkylenepolyamine condensate in 2:1 weight ratio.

The procedure for the preparation of Resin B was repeated except that the amount of polyacrylamide solution was increased to 28.3 gm. and the solution was reacted for 18 hours at room temperature.

RESIN D

The following illustrates the preparation of a resin by condensing a high molecular weight polyacrylamide with a cationic melamine-formaldehyde-polyalkylenepolyamine resin in 1:1 weight ratio.

The melamine resin was prepared by heating a mixture of 252 parts of melamine, 1620 parts of 37% formaldehyde at 75° C.; adding 120 parts of 3,3'-iminobispropylamine and 90 parts of 37.5% hydrochloric acid, maintaining the mixture at 70° C. until its viscosity reached I by Gardner-Holdt method, adding 50 parts of sodium hydroxide and 1296 parts of 37% formalin; and cooling to room temperature. The product was diluted to 12% solids with water.

A mixture was made from 16.7 ml. of the syrup thus obtained and 49.2 g. of a 4% aqueous polyacrylamide of molecular weight of approximately 800,000. The mixture was allowed to react for one hour at pH 2.0, diluted to 2% solids, allowed to react over night, and then diluted to 1% solids.

RESIN E

The foregoing was repeated except that the amount of polyacrylamide was doubled. A water-soluble resin was obtained containing a 2:1 co-resin.

RESIN F

The following illustrates the preparation of the condensation product of equal parts by weight of polyacrylamide with a linear high molecular weight polyazaalkane carrying methylolcarbamyl groups.

A high molecular weight polyazaalkane was prepared by gently refluxing a mixture of 31.7 parts of ethylene dichloride, 20.2 parts of water, and 53.1 parts of 3,3'-iminobispropylamine, cooling being applied at the outset to control the exothermic reaction. After 90 minutes of refluxing 81.2 parts of water were added, at which point the viscosity of the syrup was B–D (Gardner-Holdt method). The mixture was cooled to 37° C. and 65.4 parts of 32% hydrochloric acid added with cooling to maintain the temperature below 75° C.

The polyazaalka: hydrochloride thus formed was cooled to 37° C. and 104 parts of potassium cyanate added. The temperature of the mixture was maintained at 75° C. for 30 minutes whereby carbamyl groups were introduced. The polycarbamylpolyazaalkane thus formed was methylolated by adding 117 parts of water, 197 parts of 37% aqueous formalin and reacting at 70° C. for 90 minutes. To this was added 335 parts of water and the product cooled to room temperature. The syrup was adjusted to 12% solids by weight.

To 49.2 g. of a 4% aqueous solution of polyacrylamide of molecular weight of 800,000 was added 16.7 ml. of the above syrup. The mixture was condensed in the same manner as Resin D at pH 4.

RESIN G

The following illustrates the condensation of polyacrylamide with an aldehyde-free resin.

To 189 g. (1 mol) of tetraethylenepentamine in 500 g. of water was slowly added 178 (3 mols) of epichlorohydrin with stirring, the temperature being maintained below 50° C. Stirring was continued until the solution had become viscous. The solution was diluted with water to 15% solids.

50 cc. of the solution was condensed by standing over night with 50 cc. of a 15% polymethylol polyacrylamide solution (prepared by reacting polyacrylamide with 1 mol of formaldehyde per monomer unit present) at pH 9. The viscous syrup was then diluted to 2% solids with water.

Example 1

The foregoing co-resins were tested to determine their anchoring properties for topcoat material by standard laboratory procedure shown in the examples of U.S. Patent No. 2,796,362. According to this procedure, an aqueous impregnating bath is prepared containing the particular resin to be tested and glycerol (8% by weight) as plasticizer. Sheet regenerated film is immersed in the bath for five minutes to effect uniform impregnation, wiped dry, drained of excess solution until dry and cured at 200° F. for three minutes. The sheets are then coated with standard nitrocellulose lacquer and tested by immersion in water at 190° F. The sheets are rubbed frequently between the fingers and the time is determined for the coating to slough.

Results are as follows:

| Film No. | Co-Resin | | | | Bath | | Min. to Slough |
|---|---|---|---|---|---|---|---|
| | No. | AM.[1] Percent | Cationic Resin | | Percent Co-Resin | pH | |
| | | | Name | Percent | | | |
| 1 | | | | | | 7.0 | 1.5 |
| 2 | | 100 | | | | 7.0 | 3.5 |
| 3 | A | | Mel[2]—CH$_2$O | 100 | 0.5 | 4.5 | 87 |
| 4 | A | 50 | Mel[2]—CH$_2$O | 50 | 1.0 | 4.5 | 74 |
| 5 | A | 50 | Mel[2]—CH$_2$O | 50 | 1.0 | 7.5 | 70 |
| 6 | B | | Urea—CH$_2$O—TEPA[3] | 100 | 0.25 | 6.7 | 94 |
| 7 | B | 50 | Urea—CH$_2$O—TEPA[4] | 50 | 0.5 | 6.7 | 172 |
| 8 | C | 67 | Urea—CH$_2$O—TEPA[3] | 33 | 0.75 | 6.7 | 158 |
| 9 | C | 67 | Urea—CH$_2$O—TEPA[3] | 33 | 0.75 | 7.5 | 155 |
| 10 | D | | Mel[2]—CH$_2$O—IBPA[4] | 100 | 0.25 | 6.7 | 193 |
| 11 | D | 50 | Mel[2]—CH$_2$O—IBPA[4] | 50 | 0.5 | 6.7 | 173 |
| 12 | D | 50 | Mel[2]—CH$_2$O—IBPA[4] | 50 | 0.5 | 7.5 | 170 |
| 13 | E | 67 | Mel[2]—CH$_2$O—IBPA[4] | 33 | 0.75 | 6.7 | 173 |
| 14 | F | | MCPAA[5] | 100 | 0.25 | 7.2 | 128 |
| 15 | F | 50 | MCPAA[5] | 50 | 0.5 | 7.2 | 175 |
| 16 | G | | TEPA[3]—epi.[6] | 100 | 0.25 | 7.2 | 68 |
| 17 | G | 50 | TEPA[3]—epi.[6] | 50 | 0.50 | 7.2 | 60 |

[1] Acrylamide.
[2] Melamine.
[3] Tetraethylenepentamine.
[4] 3,3'-iminobispropylamine.
[5] Methylolcarbamyl polyazaalkane.
[6] Epichlorohydrin.

I claim:

1. Non-fibrous regenerated cellulose film containing a small but effective amount as anchoring agent of a normally water-soluble cationic thermosetting co-resin formed by subjecting a substantially non-ionic water-soluble linear carbon chain polymer at least 5% of the linear atoms of which carry a formaldehyde-reactive carboxamide substituent to condensation with a water-soluble cationic thermosetting amino-formaldehyde resin in weight ratio between 1:10 and 10:1.

2. Film according to claim 1 wherein the linear carbon chain polymer is polyacrylamide.

3. Film according to claim 1 wherein the amino-formaldehyde resin is a water-soluble cationic melamine-formaldehyde acid colloid.

4. Film according to claim 1 wherein the amino-formaldehyde resin is a water-dispersible cationic melamine-formaldehyde-polyalkylenepolyamine resin.

5. Film according to claim 1 wherein the amino-formaldehyde resin is a water-dispersible cationic polymethylolcarbamyl polyazaalkane resin.

6. Film according to claim 1 wherein the co-resin is in thermocured form.

7. Film according to claim 1 having an alkaline pH.

8. Non-fibrous regenerated cellulose film containing a small but effective amount as anchoring agent of a thermocured normally water-soluble cationic thermosetting co-resin formed by subjecting a substantially non-ionic water-soluble linear carbon chain polymer at least 5% of the linear atoms of which carry a formaldehyde-reactive carboxamide substituent to condensation with a water-soluble cationic thermosetting amino-formaldehyde resin and applying hydrophobic organic topcoat material thereover.

9. Film according to claim 7 wherein the topcoat is discontinuous printing.

10. A process of treating non-fibrous regenerated cellulose film to improve its anchoring capacity for subsequently applied hydrophobic organic topcoat material, which comprises impregnating said film with an aqueous solution containing a small but effective amount of a water-soluble cationic thermosetting co-resin formed by subjecting a substantially non-ionic water-soluble linear carbon chain polymer at least 5% of the linear atoms of which carry a formaldehyde-reactive carboxamide substituent to condensation with a water-soluble cationic thermosetting amino-formaldehyde resin, drying said film and thermocuring the resin thereon.

11. A process according to claim 9 wherein the aqueous co-resin solution contains a polyhydric alcohol plasticizer for said film.

12. A process according to claim 9 wherein the pH of the co-resin solution is alkaline.

13. A process according to claim 12 wherein the co-resin is dried sufficiently long to substantially completely thermocure the co-resin.

14. A process of treating non-fibrous regenerated cellulose film to improve its anchoring capacity for subsequently applied hydrophobic organic topcoat material, which comprises impregnating said film with an aqueous solution containing a small but effective amount therefor of a water-soluble cationic thermosetting co-resin formed by subjecting a substantially non-ionic water-soluble linear carbon chain polymer at least 5% of the linear atoms of which carry a formaldehyde-reactive carboxamide substituent to condensation with a water-soluble cationic thermosetting amino-formaldehyde resin, drying said film, thermocuring the resin thereon and applying hydrophobic organic topcoat material thereover.

15. A process according to claim 14 wherein the topcoat material is applied to the film while the co-resin is not completely thermocured.

References Cited in the file of this patent

UNITED STATES PATENTS

| | | |
|---|---|---|
| 2,556,885 | Ness | June 12, 1951 |
| 2,605,248 | Fisk | July 29, 1952 |
| 2,787,561 | Saunders | Apr. 2, 1957 |
| 2,787,603 | Saunders | Apr. 2, 1957 |

UNITED STATES PATENT OFFICE
CERTIFICATE OF CORRECTION

Patent No. 2,918,386                            December 22, 1959

William M. Wooding

It is hereby certified that error appears in the printed specification of the above numbered patent requiring correction and that the said Letters Patent should read as corrected below.

Column 7, in the table, fourth column thereof, opposite "Film No. 7" for "—TEPA4" read — —TEPA3 —.

Signed and sealed this 7th day of June 1960.

(SEAL)
Attest:

KARL H. AXLINE
Attesting Officer

ROBERT C. WATSON
Commissioner of Patents